United States Patent [19]

Hauchart

[11] 4,090,154
[45] May 16, 1978

[54] MATCHING ARRANGEMENT FOR CONVERTING BI-DIRECTIONAL SIGNALS INTO BINARY SIGNALS

[75] Inventor: Jean Lucien Alexandre Hauchart, Noisy-le-Sec, France

[73] Assignee: Compagnie Honeywell Bull (Societe Anonyme), Paris, France

[21] Appl. No.: 673,947

[22] Filed: Apr. 5, 1976

[30] Foreign Application Priority Data

Apr. 18, 1975 France .................................. 75 12201

[51] Int. Cl.² .............................................. H03H 7/38
[52] U.S. Cl. ........................................ 333/32; 328/164
[58] Field of Search ........................... 328/53, 65, 164; 333/20, 32; 178/59, 60

[56] References Cited

U.S. PATENT DOCUMENTS

| | | | |
|---|---|---|---|
| 3,754,196 | 8/1973 | Collins | 333/32 X |
| 3,838,347 | 9/1974 | Läuffer | 328/164 |
| 3,927,257 | 12/1975 | Copenhafer | 178/60 |

Primary Examiner—Paul L. Gensler
Attorney, Agent, or Firm—Cameron, Kerkam, Sutton, Stowell & Stowell

[57] ABSTRACT

A matching network for distributing high frequency bi-directional signals transmitted along a coaxial transmission line includes a transformer and an active filter having a second order transfer function for coupling a transmitter or a receiver to the transmission line. A comparator comprising trigger-connected differential amplifiers converts the output of the filter to bi-directional signals.

10 Claims, 7 Drawing Figures

MATCHING ARRANGEMENT FOR CONVERTING BI-DIRECTIONAL SIGNALS INTO BINARY SIGNALS

BACKGROUND OF THE INVENTION

The present invention relates to a network for distributing high-frequency bi-directional signals in a data-processing installation.

The network of the invention for distributing bi-directional signals is formed by a coaxial cable which provides a series supply to a plurality of connection points for the connection of pieces of data-processing apparatus capable of multiple and diverse functions. The link between a piece of apparatus and the coaxial cable is provided at the connection point by a matching device which in the case of reception converts the bi-directional signals into binary signals compatible with the technical characteristics of the logic circuits of the piece of apparatus connected to the connection point and which in the case of transmission converts the binary signals emitted by the piece of apparatus connected to the connection point into bi-directional signals. In the context of the invention a bi-directional signal has the following characteristics:

(1) it is able to assume alternately two voltages of opposite sign on either side of a middle voltage level;

(2) the transmission of binary data by means of bi-directional signals takes place in such a way that a number "1" expressed in binary code is always associated with a voltage which is positive or negative with respect to the middle voltage of the bi-directional signal and that a binary "0" is always associated with the middle voltage of the bi-directional signal;

(3) two successive "1's" expressed in binary code are transmitted in the form of two signals of opposite polarity in bi-directional transmission.

The present-day trend in producing equipment for transmitting pulses by cable between transmitter and receiver apparatus is to electrically isolate the earth or ground circuits of the pieces of apparatus from one another, the chief advantage of which is to improve the signal-to-noise ratio in transmission. Two types of isolation techniques are used at present, the first of which isolates by means of an electro-optical arrangement, and the second of which uses a pulse transformer to separate the transmitter electrically from the receiver.

A first example of matching between a cable and a receiver is disclosed in a French patent application, published as No. 2170990, corresponding to U.S. application Ser. No. 225,793 filed Feb. 14, 1972 now abandoned in which is described transmission-line matching by means of an electro-optical arrangement. The arrangement which is described allows a transmission rate of 20,000 bauds over a distance of the order of a kilometer.

A second example of matching between a cable and a receiver makes use of an inductive wound transformer at transmission and reception, is disclosed in a French patent application published in France on Sept. 21, 1973 as No. 2172154, and is readily adapted to telephone lines. The transformer used is provided with a magnetic core whose hysteresis loop is practically rectangular and thus allows the magnetic core to be switched from a first state to a second state as dictated by the value of the binary signal applied to the primary winding of the transformer.

When the frequency of the transmitted signals is very much higher than that referred to in the latter two French patent applications, the arrangements described in the two applications can no longer be used. In effect, in the case of signals having a frequency of the order of 1 MHz, electro-optical coupling cannot be used because of its narrow pass-band. It is likewise impossible to make use of transformer coupling by exploiting the changeover of its magnetic core between two states, because this causes instability in the transmission line due to the multiple reflection of the signal, which is very difficult to bring under control.

The matching of the present invention employs a transformer for coupling to the transmission line. This coupling differs from the transformer coupling described in the second of the French patent applications mentioned above by virtue of the fact that the hysteresis loop of its magnetic core is not rectangular and that the magnetic core operates on the linear part of its hysteresis loop. The inductance of the transformer is sufficiently great for the magnetising field to be obtained by a minimum of primary current, thus giving low "back-swing" levels. A definition of "back-swing" may be found on page 125 of the book "Electronique des Impulses", Volume 1, by Georges Metzger and J. P. Vabre, pub. Editions Masson et Cie.

Despite the advantages of operation achieved with low "back-swing" levels, nevertheless there are certain drawbacks to using such a transformer to couple a coaxial cable transmission line to a transmitter or a receiver. The resultant increase in the primary inductance of such a transformer increases the sum of the capacitances between the turns of the windings of the primary and secondary. This presents a loading impedance on the line, formed by a capacity representing the sum of the inter-turn capacities and which is connected in parallel with the inductance of the primary and in parallel with the impedance of the active load. Assuming the impedance of the active load to be very high in comparison with the primary inductance and the capacity, the impedance of the active load may be ignored. The same applies for the inductance of the primary if its impedance is very high in comparison with the sum of the inter-turn capacities, and a transmission line which is fed by a source E via a pulse transformer as defined above and which is connected to an active load of very high impedance via a transformer having the same characteristics as that defined above may therefore be considered as a line which is fed directly with the supply voltage E and whose load is a capacity C representing the sum of the inter-turn capacities of the primary and secondary windings of the transformer.

It is known that a transmission line whose load is an impedance other than its characteristic impedance is subject to multiple reflections. In accordance with conventional transmission line theory, the general equation which defines the law governing the change in potential gradient V at a point X along a transmission line is of the form:

$$\frac{\delta^2 V}{\delta X^2} = RGV + (RC + LG)\frac{\delta V}{\delta t} + LC \cdot \frac{\delta^2 V}{\delta t^2} \quad (1)$$

which in the case of a loss-free (R = 0 and G = 0) line may be written:

$$\frac{\delta^2 V}{\delta X^2} = LC \frac{\delta^2 V}{\delta t^2} \quad (2)$$

If one defines $$U = \frac{1}{\sqrt{LC}} = \frac{1}{\delta}$$

where U is the speed of propagation and δ the propagation constant, equation (2) becomes $$\frac{\delta^2 V}{\delta X^2} - \frac{1}{U^2} \cdot \frac{\delta^2 V}{\delta t^2} = 0$$

It admits as an integral $$V(X,t) = g(x - Ut) + h(X = Ut)$$

$$I(X,t) = \frac{V(X,t)}{R_c} = \frac{1}{R_c} \cdot [g(X - Ut) + h(X + Ut)]$$

It can be demonstrated that the voltage and current waveform at any point whatsoever along the line is the result of two moving waves which are propagated in opposite directions at the same speed U.

For further details reference may be made to the work by Messrs. Georges Metzger and Jean Paul Vabre, entitled "Electronique des Impulsions", Vol. II, page 21.

The equation for the incident wave is $$V_i = g(x - Ut) \quad (3)$$

$$i_i = \frac{1}{R_c} g(x - Ut) \quad (4)$$

The equation for the reflected wave is $$V_r = h(X + Ut) \quad (5)$$

$$i_r = \frac{1}{R_c} g(X - Ut) \quad (6)$$

Thus, at each point where a transformer is connected to the transmission line, there will be a mis-match which will produce from an incident wave a transmitted wave which continues to be propagated in the direction of the incident wave, and a reflected wave which is propagated in the opposite direction. If there are a plurality of connection points along the line, there will be a plurality of successive mis-matches, and the transmitted wave from a mis-matched point will behave like an incident wave which, at the next mis-matched point, will in turn produce another transmitted wave and another reflected wave. Thus, if there are $n$ mis-matched points, there will be $n$ waves reflected to each point where a transformer is connected, and the voltage level of the reflected waves may be comparable to the level of the $n$ useful signals. It is necessary to take precautions in the reception circuits to avoid any errors in interpretation.

Hereinafter reflected signals on a capacitive loaded line will be referred to as "capacitive echos". The capacitive echos may be separated from the useful signals by adding at the end of the line a passive filter of the first order. If the capacitive echo is likened to a signal of the form $U_O \text{Exp} -t/\tau$ and if this signal is applied to the input of a low-pass filter whose transfer function is $$\frac{1}{P + P_1},$$

the response from the output of the filter will be of the form $$\frac{U_O}{P + \frac{1}{t}} \cdot \frac{1}{P + P_1},$$

which is the Laplace function converted from $$\frac{\tau}{\tau - \theta} \left[ \text{Exp} \frac{-t}{\tau} - \text{Exp} \frac{-t}{\theta} \right]$$

by taking $P = 1/\theta$.

If the time constant of the passive low-pass filter is large in comparison with $\tau$, the amplitude of a filtered capacitive echo decreases markedly and the decay voltage persists for a longer time.

If a stepped signal is applied to the low-pass passive filter, the output response from the filter is of the form $E(1 - \text{Exp} -t/\theta)$.

The addition of the low-pass passive filter is thus a satisfactory solution to the problem of separating the useful signal from the capacitive echo, but it solves only part of the problem and it is in fact necessary to match the line and the low-pass filter to the circuit for shaping and converting the bi-directional signals to give binary signals. It is necessary that the stages for shaping the received pulses should not interfere with the transmission line. Threshold detectors cannot be inserted immediately beyond the passive low-pass filter, since changeover devices of this nature draw a high current at the time of changeover, which would interfere with the low-pass filter and thus with the line. The idea has been considered of connecting the secondary of the transformer to the input of an operational amplifier connected as a voltage follower whose pass-band is twenty times larger than that of the useful frequency of the signal and whose input impedance is thus very high, the low-pass filter being connected directly to the output of the operational amplifier. This solution is also unacceptable since the output pulses are distorted in comparison with the input signal both in respect of amplitude and duration. The input signal saturates the first stage of the operational amplifier and its output voltage cannot catch up with the input signal. Equally unpromising results have been obtained by inserting the passive low-pass filter between the secondary of the transformer and the input of the operational amplifier.

The problem could no doubt be solved with a voltage-following differential operational amplifier having a pass-band very much wider than 20 MH$_z$, but this would be a very cumbersome solution.

SUMMARY OF THE INVENTION

The present invention thus has as an object to provide a matching network which is able to shape the bi-directional pulses transmitted along a coaxial cable, which is able to filter capacitive line echos, and which is able to reconstitute the signals to their correct length and amplitude. The invention will be better understood from the following description of a preferred embodiment of the invention, given with reference to the accompanying drawings.

DETAILED DESCRIPTION OF THE INVENTION

FIG. 1 shows the form of the bi-directional signals transmitted along the coaxial line. It can be seen from the Figure that the voltage of the bi-directional signals transmitted to the input of the coaxial cable changes between a value $+U$ and a value $-U$, and that either of these two values corresponds to the value binary 1. When the voltage is zero the corresponding value is binary 0. Changes of state take place at times which are inversely proportional to the number N of bits per second transmitted along the line, that is to say at times which are multiples of $T = 1/N$.

Figure 1A:
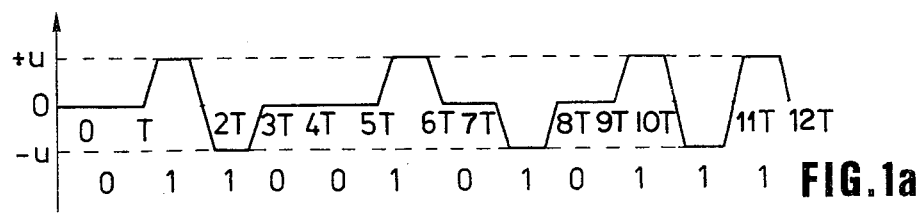
FIG. 1a shows diagramatically bi-directional signals transmitted along a coaxial line.
Figure 1B:
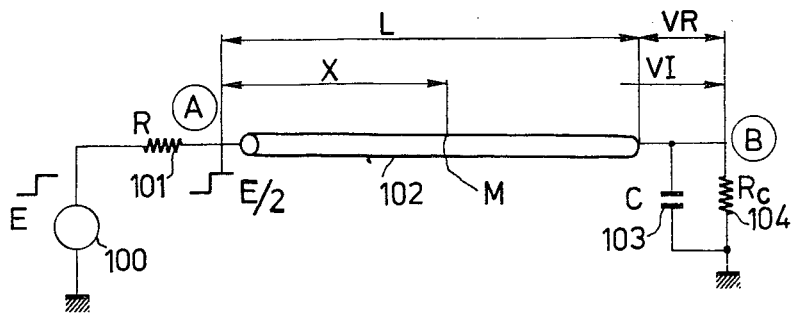
FIG. 1b shows diagramatically a coaxial transmission line whose load at one end is its characteristic impedance in parallel with a capacitor and which is fed by a generator whose internal impedance is equal to the characteristic impedance of the line.

Consider one mis-matched point along the line. Downstream of this point there is a transmitted wave which continues to be propagated. If the downstream echos caused by the transmitted wave are ignored for the moment and if the line is assumed to be perfectly matched downstream, the line downstream is equivalent to its characteristic impedance $R_c$ connected in parallel with the line upstream of the mis-matched point, as shown in FIG. 1b. Generator E 100 feeds line 102 through a resistor $R_c$ 101 whose resistance is equal to the characteristic impedance of the line, the other end of line 102 being connected to the common point of a capacitor C 103 and a resistor $R_c$ 104 whose other two ends are connected to earth potential. The line input connected to resistor 101 is referred to by letter A and the line output by letter B. Since resistor $R_c$ 101 is equal to the characteristic impedance of the line, there is no reflection at A. The load impedance of the line at point B is however different from the characteristic impedance of the line and at this point there arises an incident wave referred to as $V_I$ and a reflected wave referred to as $V_R$.

The incident voltage at point A of the line is given by $V_i/i_i = R_c$, and the reflected voltage at point B of the line is given by $V_R/i_R = -R_c$. The resulting voltage and current at point B are given by the following equations:

$$V_B = V_i + V_R \quad (7)$$

$$i_B = i_i + i_R \quad (8)$$

and the value of the load impedance at B is $$Z + \frac{R}{1 + R_c CP} .$$

using operational calculus where $P$ is a symbolic variable represented by the expression $P = \alpha + j\mu$.

If the applied voltage E is a voltage step $E \cdot v_{(t)}$, its Laplace transform is $E/P$, given $V_i = E/2P$ and $i_i = E/2R_cP$ Equations (7) and (8) may thus be written $$V_B = Z i_B = 1 + R_c CP (i_i + i_R) = V_i + V_R$$

or $$\frac{E}{2P} + V_R = \frac{R}{1 + RCP} \left( \frac{E}{2RP} - \frac{V_R}{R} \right)$$

and by taking $\theta = R_c C$ $$V_R = -\frac{E}{2} \cdot \frac{\frac{\theta}{2}}{1 + \frac{\theta}{2} \cdot P}$$

whence $V_{R(t)} = (E/2) \cdot \text{Exp}^{-2t/\theta}$ and by applying this value to equation (7), the equation for B becomes $$V_{Bt} = (E/2)(1 - \text{Exp}^{-2t/\theta}) \quad (9)$$

Consideration will now be given to what occurs at a point M along the line at a distance X from point A. The length of the line between the points A and B will be referred to as L.

At M the incident wave is $$V_{i(t)} = \frac{E}{2} \cdot v(t - \delta \cdot X) \quad (10)$$

X being the propagation time for the incident wave to travel from A to M
$V_{i(t)} = 0$ when $t < \delta X$
$V_{i(t)} = E/2$ when $t \geq \delta X$ Consideration will now be given to the reflected wave generated by the incident wave which arrives at B. The propagation time for the incident wave between A and B is $L/U = \delta L$ and the propagation time for the reflected wave between B and M is $$\frac{L - X}{U} = \delta (L - X).$$

Starting from the time origin, the reflected wave will arrive after a time of $$\delta \cdot L + \delta(L - X) = \delta (2L - X)$$

$Vr(t)$ can therefore be written $$V_{r(t)} = \frac{E}{2} (1 - \text{Exp}^{-2t/\tau}) \cdot v\, t - \delta (2L - X)$$

with $Vr(t) = 0$ when $t < \delta (2L - X)$ $$V_{r(t)} = \frac{E}{2} (1 - \text{Exp}^{-2t/\theta}) \text{ when } t \geq (2L - X)$$

To sum up, the equations for the incident wave at a point M at a distance X from point A may be written $$V_i(X,t) = \frac{E}{2} \cdot v(t - \delta X)$$

$$i_i(X,t) = \frac{E}{2} \cdot \frac{1}{R} \cdot v(t - \delta X)$$

and the equations for the reflected wave at a point M at a distance X from point A may be written $$V_r(X,t) = \frac{E}{2}(1 - \text{Exp}^{-2t/\theta}) \cdot v[t - \delta(2L - X)]$$

$$i_r(X,t) = \frac{E}{2} \cdot \frac{1}{R}(1 - \text{Exp}^{-2t/\theta}) \cdot v[t - \delta(2L - X)]$$

If it is desired to know the response of the line to a pulse of width $t_1$, it is merely necessary to repeat the above calculations twice by superimposing the following two incident waves $$V_{i_1(t)} = \frac{E}{2} \cdot v(t) \text{ and } V_{i_2(t)} = -\frac{E}{2} \cdot v(t - t_1)$$

Figure 1C:
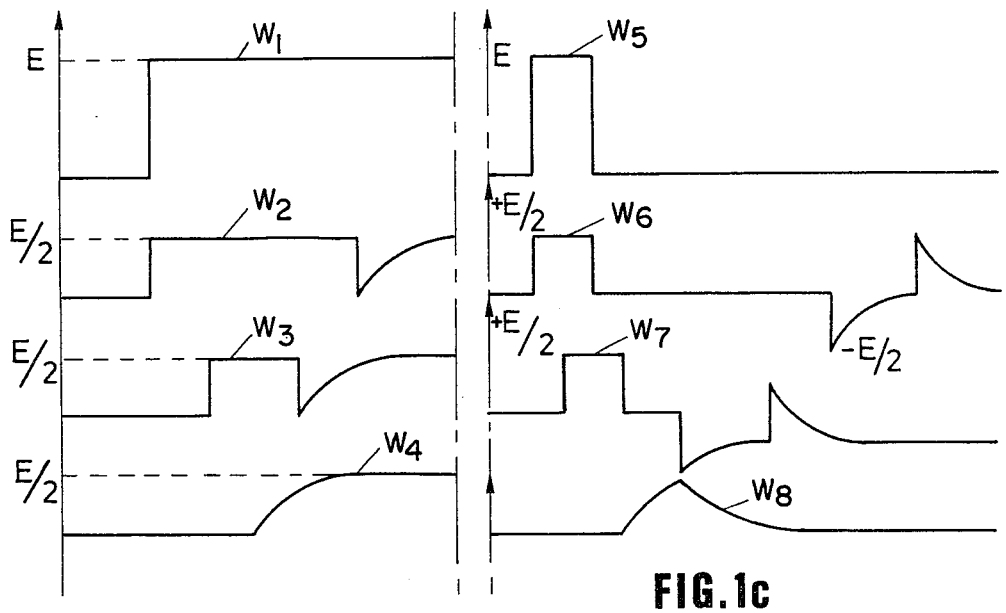
FIG. 1c shows, with respect to time, the conditions at different points along the transmission line when a voltage step and a voltage pulse are applied to it.

A graphic representation of these voltages at different points alone the line is shown in FIG. 1c. Two sets of waveforms are shown in the Figure. The first represents a voltage step E·v (t) represented by waveform $W_1$ being applied to the line. The corresponding signal at the beginning of the line is represented by waveform $W_2$, the signal along the length of the line is represented by waveform $W_3$ and the signal at the end of the line is represented by waveform $W_4$. The second series of waveforms represents a pulse being applied to the line by generator $W_5$. Waveform E represents the output signal from the generator. Waveform $W_6$ represents the signal at the beginning of the line, waveform $W_7$ the signal along the length of the line and waveform $W_8$ the signal at the end of the line.

There will now be considered a transmission line along which there is a transmitter and $n$ connection points which are spaced apart by distances L1, L2 ... Ln and each have a mis-match capacitance C. The apparent impedance of these capacitances is Zc/2. At these capacitive connection points, a voltage step will produce an echo corresponding to a differentiated step E, i.e. $V_{(t)} = E \cdot \text{Exp}^{-t/\tau}$ with $$\tau = \frac{Zc}{2} C.$$

A negative-going step will produce a corresponding positive-going voltage peak and a positive-going step will produce a corresponding negative-going voltage peak. The capacitive echo at a first connection point situated at a distance of $L_1$ from the emitter will return to the emitter after a time of 5 nanosec/m × $2L_1$ = 10 $L_1$ nanosec 1m. The 5 nanosec/m represents the propagation constant along the line. The echo at the second connection point situated at a distance of $L_1 + L_2$ from the emitter will return to the transmitter after a time of 5 nanosec/m × 2(L1 + L2) = 10 (L1 + L2) nanosec, and the echo from the $n^{th}$ connection point situated at a distance of $$\sum_{i=1}^{n} L_i$$

from the transmitter will return to the emitter after a time of $$10 \sum_{i=1}^{n} L_i.$$

Depending upon the distances between the connection points, it is possible to have a plurality of echos of the same polarity which follow one another and if the lengths L1, L2, L3 are sufficiently small it may even happen that one echo is not over before the next arrives.

Figure 1D:
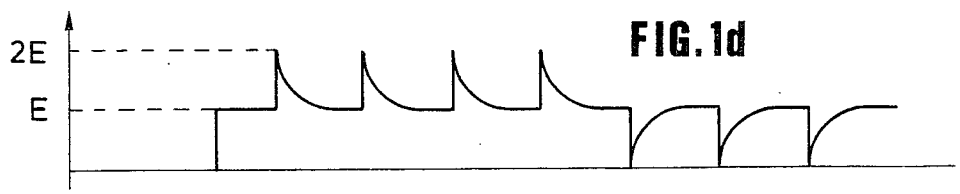
FIG. 1d shows, with respect to time, the successive echos resulting from a voltage step being applied to the transmission line.

FIG. 1d is a summary of this situation and shows the successive echos resulting from the line having a stepped voltage applied to it.

Since the integration of a signal causes it to persist for a longer time the longer the integration, it can be seen that echos of the same polarity at successive connection points may add to one another if the connection points are sufficiently close together and if the integration is sufficiently long.

The arrangements described in the following description enables the foregoing problems to be solved.

DESCRIPTION OF THE PREFERRED EMBODIMENT

Figure 2:
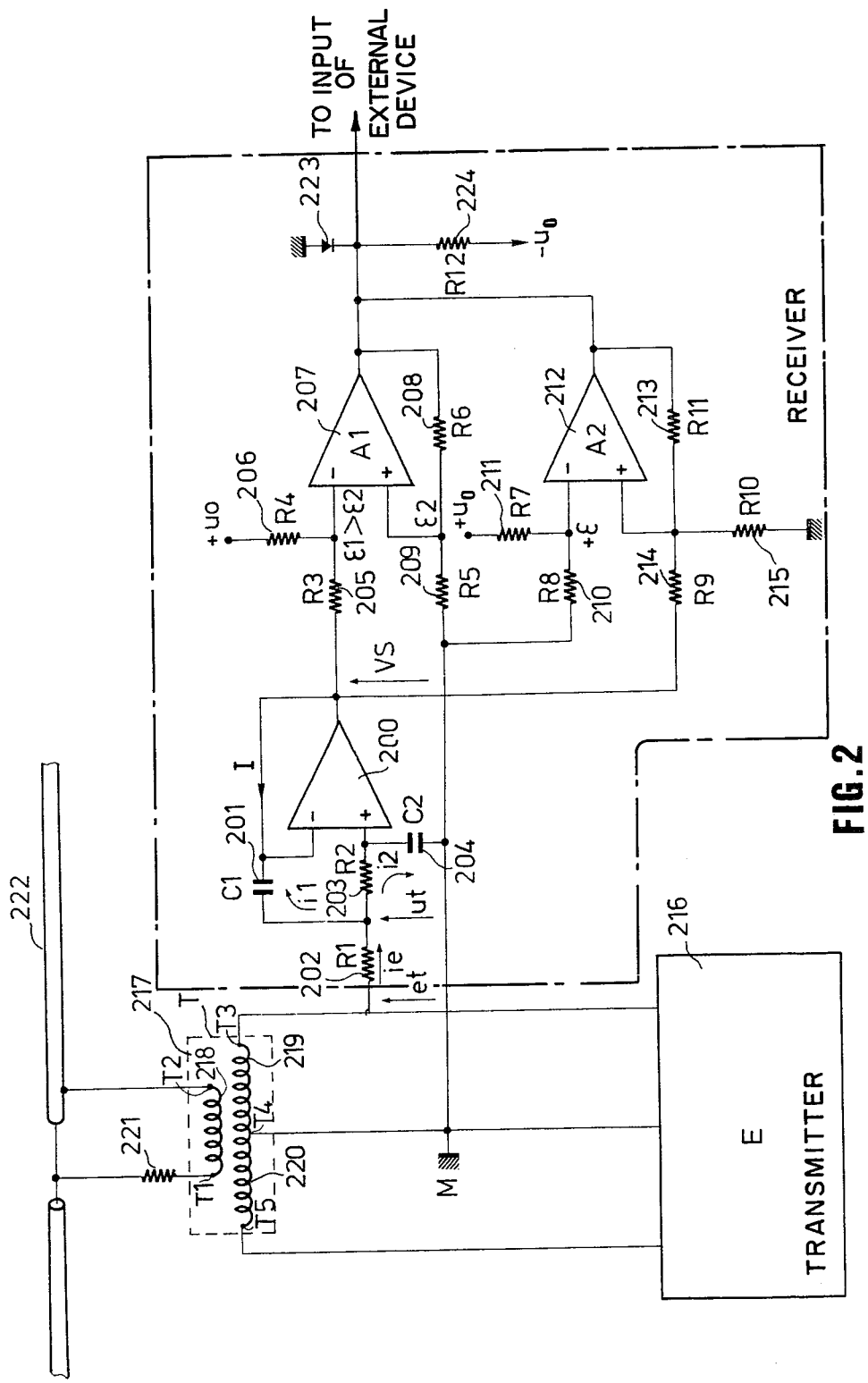
FIG. 2 shows a preferred embodiment of the invention as interconnected with a line transmitter/receiver.

FIG. 2 is a preferred embodiment according to the invention of a line transmitter/receiver.

The coaxial cable 222 is connected to a transformer 217 via a resistor 221. Resistor 221 is connected between the core of the coaxial cable and an end $T_1$ of a winding 218 the other end of which is connected to the sheath of the coaxial cable. The other two windings 219 and 220 of transformer T 217 are connected by their ends T3, T4 and T5 to a transmitter E 216 which transmits signals of two polarities, one polarity being obtained by exciting winding 219 and the other polarity being obtained by exciting winding 200. The common point T4 of windings 219 and 220 is connected to earth or ground at point M. The end T3 of winding 219 feeds the input of an active filter having a second order transfer function consisting of a differential amplifier 200, resistors R1 202, R2 203 and capacitors C1 201 and C2 204. Resistor R1 202 is connected between point T3 of winding 219 and the common point of resistor R2 203 and capacitor C1 201. Resistor R2 203 is connected between the common point of resistor R1 202 and capacitor C1 201, and the positive input of differential amplifier 200.

The positive input of differential amplifier 200 is connected to one end of capacitor C2 204, the other end of which is connected to earth potential. The other end of capacitor C1 201 is connected to the output of differential amplifier 200 and to its negative input, which thus produces total feed-back for amplifier 200. Capacitor C1 201 is thus connected to the output of differential amplifier 200 and to its negative input, which thus produces total feed-back for amplifier 200. Capacitor C1 201 is thus connected between the common point of the two resistors R1 202 and R2 203 and the negative input of amplifier 200. The output Vs of amplifier 200 is connected to a resistor R3 205 and to a resistor R9 214. The other ends of these resistors are connected respectively to the negative input of an amplifier A1 207 which is also connected to one end of resistor R4 206 whose other end receives a steady biassing voltage of $+U_o$ volts; and to the positive input of an amplifier A2 212 which is also connected to one end of a resistor R10 215, the other end of which is connected to earth potential and to the end of a resistor R11 213 whose other end is connected to the output of amplifier 212. The positive input of amplifier A1 207 is common to two resistors R6 208 and R5 209, the first of which is connected at its other end to the output of amplifier A1 207 and the second of which is connected at its other end to earth potential. The negative input of amplifier A2 212 is common to two resistors R7 211 and R8 210, the first of which is connected at its other end to a constant potential $U_o$ and the second of which is connected at its other end to earth potential. The outputs of the two amplifiers A1 207 and A2 212 are both connected to the cathode of a diode 223 whose anode is at earth potential. The cathode of diode 223 is connected to one end of a resistor R12 224 the other end of which is connected to a potential $-U_o$.

In a preferred embodiment of the invention, amplifier 200 is of the SN 72310 type as manufactured by Texas Instruments and the comparison amplifiers 207 and 212 are part of a double module numbered SN 72711 also manufactured by Texas Instruments.

If the voltage which appears between point T3 of winding 219 and earth is referred to as $e_t$, if the voltage which appears between the point common of resistors R1, R2 and of capacitor C1 and earth is referred to as $U_t$, if the current flowing in R1 is referred to as $i_e$, that flowing in R2 as $i_2$, that flowing in C1 as $I_1$, and that flowing between the output of differential amplifier 200 and its input as I, and if the output voltage from amplifier 200 is referred to as $V_s$ and if the input voltage to the point + of the differential amplifier is referred to $V^+$ and if the input voltage to the point − of the differential amplifier is referred to $V^-$, it is easy to find the transfer function of the filter between the output voltage $V_s$ and the input voltage $e_t$. It will be assumed that the open-loop gain G of amplifier 200 is very large in comparison with unity and that the input impedances at positive input + negative output - are infinite. The following equations may therefore be obtained:

$$I = i_1 = C_1 P (U_t - V)$$

$$V_+ = \frac{i_2}{C_2 P}$$

$$V_s = V -$$

$$i_2 = \frac{U_t}{R_r + \frac{1}{C2P}}$$

$$V_s = G(V^+ - V^-)$$

$$i_e = i_1 + i_2$$

$$e_t = R_1 i_e + U_t$$

the transfer function $f(p)$ may then be written as $$F_p = \frac{V_{s(P)}}{e_t(P)} = \frac{W_o^2}{p^2 + 2\beta P + W_o^2}$$

with $2\beta = \frac{1}{R_1 C_1} + \frac{1}{R_2 C_1}$ and $W_o^2 = (R_1 C_1)(R_2 C_2)$
and by saying that $\zeta = \beta/W_o$ and $s = (P/W_o) F_p$ may be written $$F_p = \frac{1}{s^2 + 2\xi s + 1}$$

The transfer function of the filter is thus of the second order and its damping factor is $\zeta$. It is known that if the value adopted for $\zeta$ is between 0.7 and 0.8 then the attenuation caused by such a filter is 12 dB/octave beginning from a frequency of $\rho o = W_o/2\pi$. To meet the Nyquist criterion, the frequency adopted for $\rho o$ will be that of the bi-directional signals. The value found for $\zeta$ = 0.71 with R1 = R2 and C1 = 2C2.

With this circuit it is found that differential amplifier 200, which is wired as a follower stage owing to the total feed-back from its output $V_s$ to the input, exactly follows the voltage applied to its positive input. The circuit so formed prevents the first stage differential amplifier 200 from being saturated and there are no longer any saturation phenomena such as exist with an uncorrected follower amplifier. The output waveform no longer varies as a function of the amplitude of the input voltage or the length of the pulse in question.

The capacitive echos are integrated and the resulting signal level is lower than with a first-order filter of equivalent pass-band, but the decay time on the other hand is greater.

Comparators A1 and A2 convert the bi-directional signals from output $V_s$ of amplifier 200 into binary signals. When a zero voltage is applied by the output of amplifier 200 to the inputs of the comparators, the outputs of amplifiers A1 207 and A2 212 are at a potential of 0 volts at the ready threshold of diode 223, which is in its conductive state. A positive signal with respect to earth at the inputs of the comparators causes the output of amplifier A2 212 to change state, if it was at the 0 volt level, by changing from 0 volts to its positive saturation potential. Diode 223 ceases to conduct. A negative signal with respect to earth causes the output of amplifier A1 207 to change state, if it was in the 0 volt state, by changing from the 0 volt state to its positive saturation potential, and as before diode 223 ceases to conduct. The two amplfiers A1 207 and A2 212 are trigger-connected (the positive feedback is supplied by resistors R6 208 and R11 213) and depart from the quiescent state only if the output voltage $V_s$ from differential amplifier 200 is sufficient to change over the comparators. The changeover thresholds are defined by the values of resistors R3, R4 and R7, R8, that is to say by the values $$\frac{U_O \cdot R_3}{R_3 + R_4} \text{ and } \frac{U_O \cdot R_8}{R_7 + R_8}$$

It is sufficient to set the threshold above the level of the filtered capacitive echos. The advantage of trigger-connecting the differential amplifiers is that it allows the comparators to change over quickly when the input voltage is close to the triggering threshold and it suppresses the oscillations which would inevitably occur if the amplifiers were not provided with positive feedback.

Figure 3:
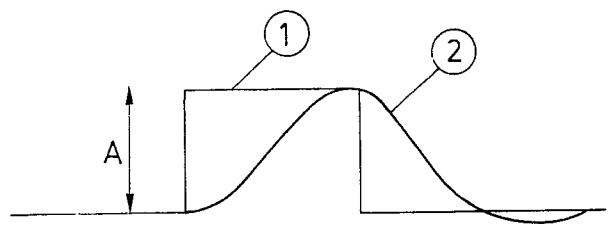
FIG. 3 shows the response of the second order filter used in the invention to a square-wave pulse.

FIG. 3 shows the response of the second order active filter incorporating differential amplifier 200 to a square-wave pulse. The voltage pulse ① represents the voltage $e_t$ applied to the input of the filter. Curve ② represents the response of the second order active filter to the input signal ①. The length of the pulse ① is 600 ns. The rise time of curve ② is the same as its decay time and tests have shown that these times are the same whatever the amplitude A of the input signal ①.

Figure 4:
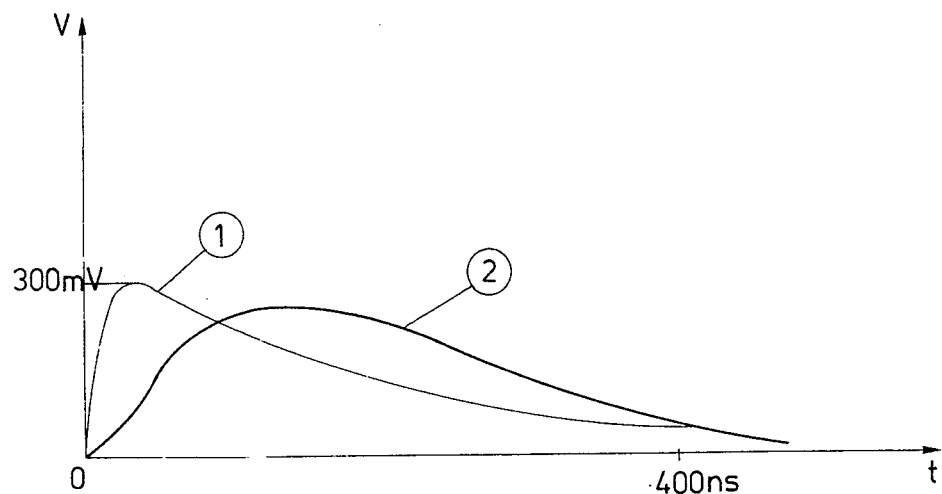
FIG. 4 shows the response of the second order filter used in the invention to a capacitive echo.

FIG. 4 shows the response to a capacitive echo of a passive filter of the first order (curve ①), and of the active filter of the second order according to the invention (curve ②). The equation for the capacitive echo was $e_t = E \cdot \text{Exp}^{-t/}\tau$ with $E = 5$ volte and $\tau = 12$ ns. The time constant of the first order passive filter was 144 ns and its cut-off frequency was 1.1 MHz. Curve ① shows that the amplitude of the echo is reduced to 300 mV. By applying the same echo to the second order active filter, curve ② is obtained. The maximum amplitude of the response is less than 300 mV but it can be seen that the decay is longer and lasts for a period of approximately 400 ns.

The matching network which has just been described allows high performances to be achieved. The repetition frequency of the signals is in the MHz region and enables transmissions to be made over long lengths of cable, namely between 500 meters and 1 km, whilst allowing a large number of connection points to be connected to the cable, namely up to 64.

It is clear that it would be possible for the man skilled in the art to improve the performance of the arrangement which has just been described, without thereby departing from the scope of the invention.

I claim:

1. A matching network for receiving a high frequency bi-directional signal transmitted on a coaxial cable comprising a magnetic-induction transformer having a first winding connected to the coaxial cable and a second winding magnetically coupled to the first winding, an active filter having a second order transfer function, said second winding being connected to the input of said active filter, a comparator having a first input and a second input, the output of said active filter being connected to said first and said second inputs such that the bi-directional signals are converted into binary signals, the values of the thresholds of the comparator at its first and its second input being greater in absolute terms than the level of the capacitive noise appearing on the cable, which reappears filtered at the output of said active filter.

2. A matching network according to claim 1 wherein the attenuation coefficient of the second order transfer function of the active filter is between 0.7 and 0.8 and the cut-off frequency of the filter corresponds to that of the bi-directional signals transmitted along the coaxial line.

3. A matching network as set forth in claim 1 wherein said first and second differential amplifier each have a positive feedback.

4. A matching network according to claim 1 wherein the comparator comprises a first and a second differential amplifier.

5. A matching network according to claim 4 wherein said first differential amplifier has a positive threshold and said second differential amplifier has a negative threshold.

6. A matching network according to claim 4, further including a diode, the outputs of said first and said second amplifiers both being connected to the cathode of the diode, the anode of said diode being connected to a ground reference potential and the cathode of said diode being connected to the end of a resistor the other end of which has a negative potential applied to it.

7. A matching network according to claim 1 wherein the second order active filter comprises a high-gain differential amplifier having a negative input, a positive input and an output, a capacitor connected between the output of said high gain differential amplifier and the positive input of the amplifier through one of two serially connected resistors, one end of said resistors being connected to the positive input of the amplifier, the common point of two resistors being connected to the capacitor and the other end of said resistors being connected to said second winding for receiving the signal to be filtered.

8. A matching network as set forth in claim 7 wherein said series connected resistors are of equal value.

9. A matching network as set forth in claim 7 further including a capacitor connected between the positive input of the differential amplifier and the ground reference point for the voltage levels of the network.

10. A matching network according to claim 9 wherein the value of the capacitor connected to the positive input of the differential amplifier which forms the second order active filter is twice the value of that connected to the positive input of the differential amplifier.

* * * * *